H. D. COLMAN.
TRAVERSE MECHANISM FOR WINDING MACHINES.
APPLICATION FILED OCT. 30, 1911. RENEWED FEB. 10, 1916.

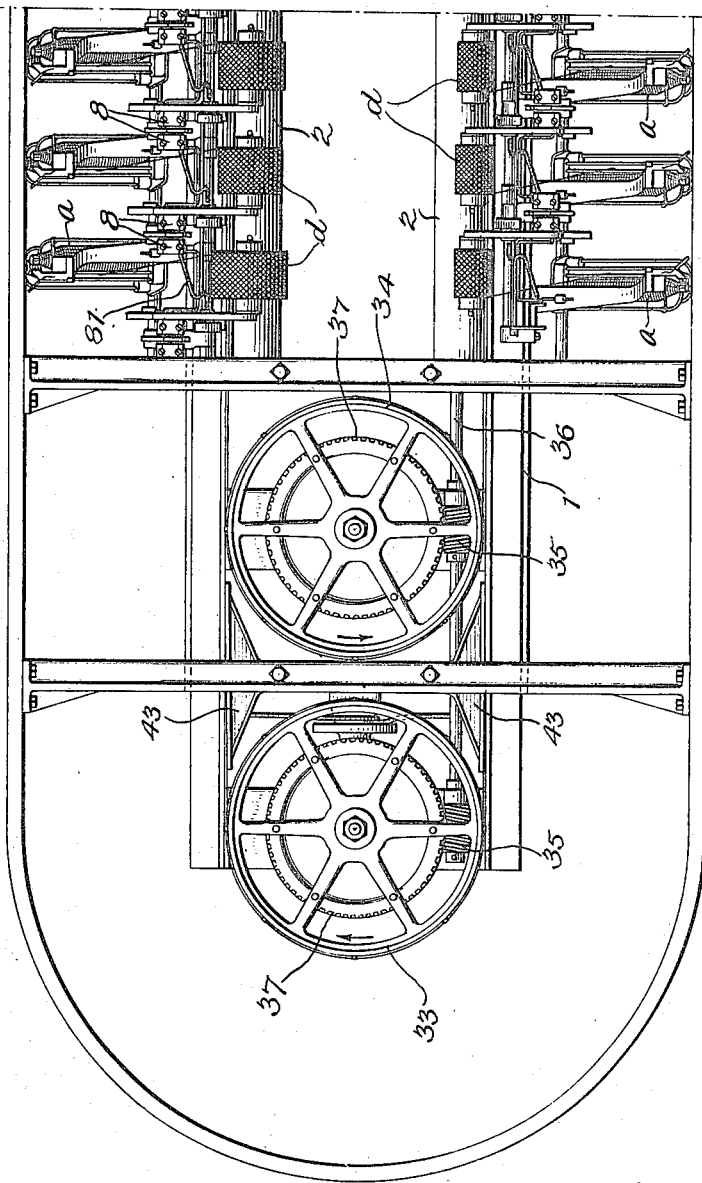

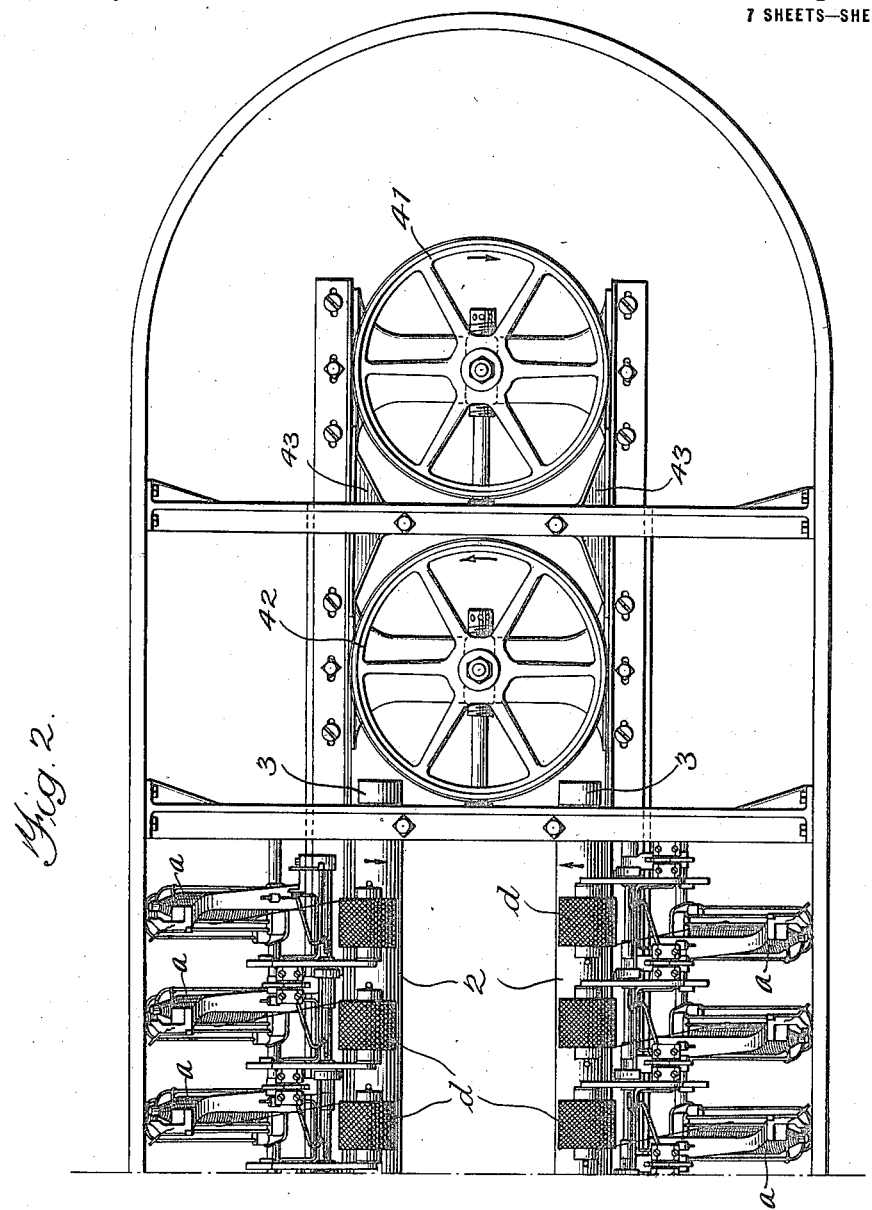

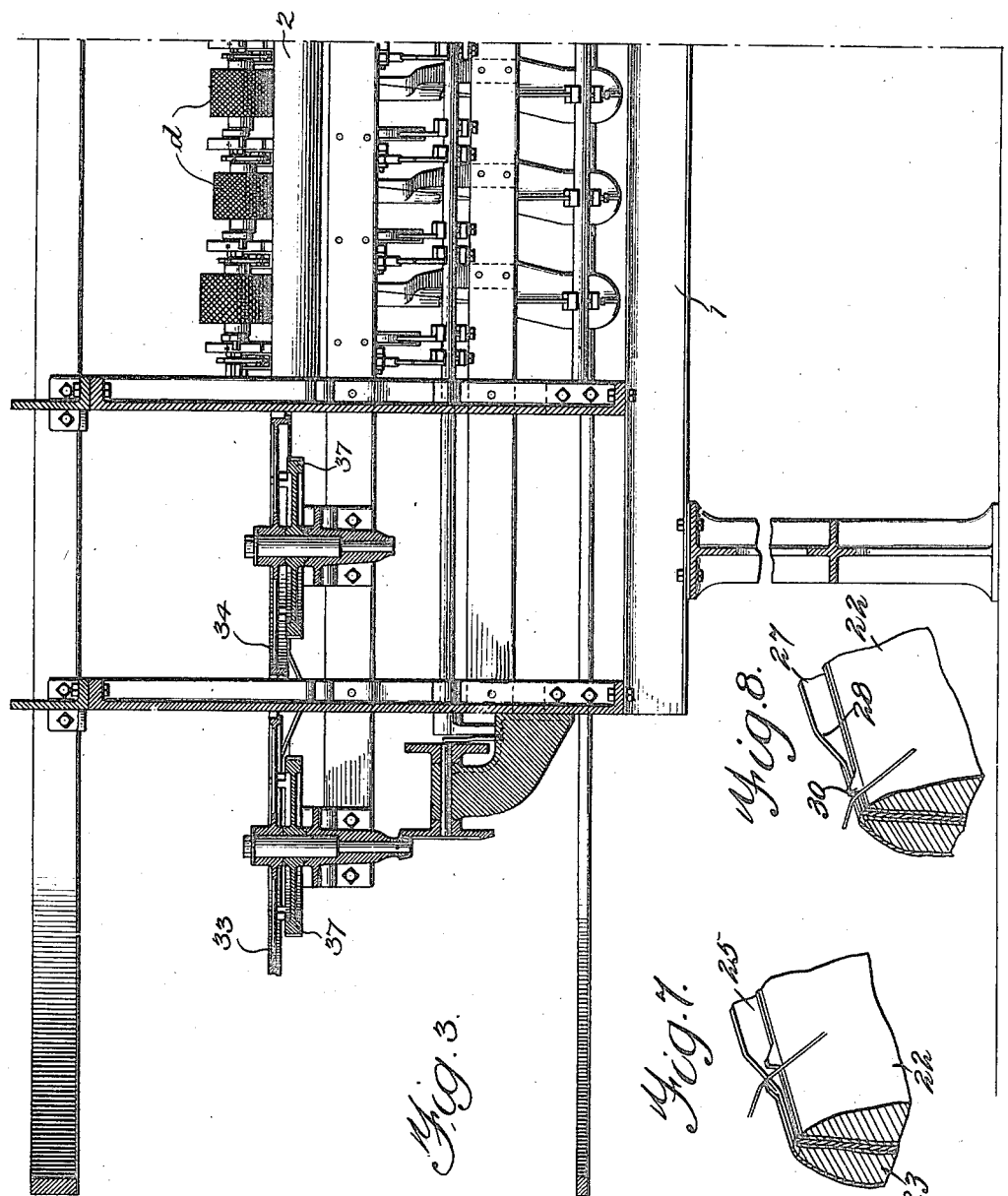

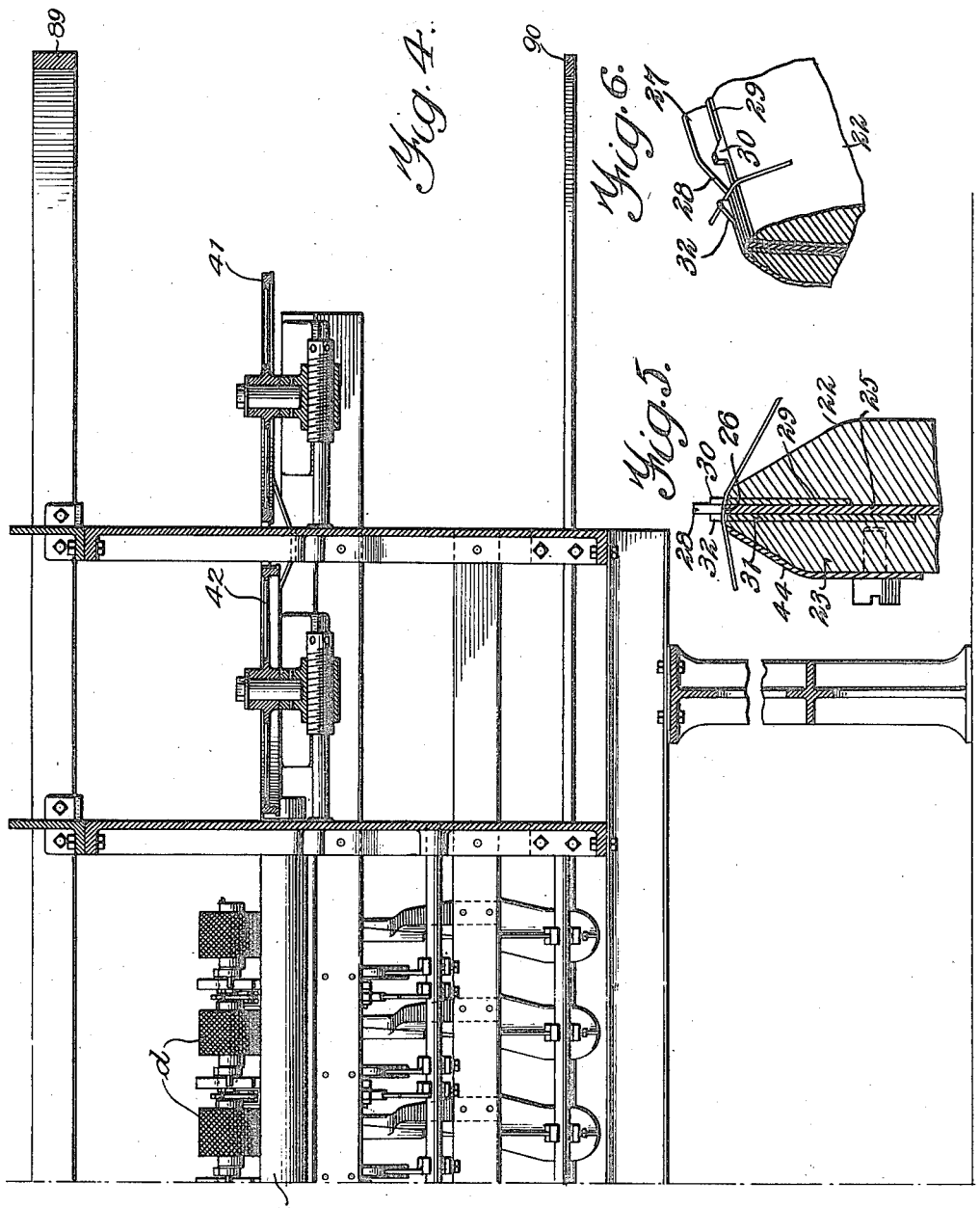

1,239,669.

Patented Sept. 11, 1917.

7 SHEETS—SHEET 5.

Witnesses:
J. C. Devick.
George L. Chindahl

Inventor:
Howard D. Colman.
By Luther L. Miller,
Attorney.

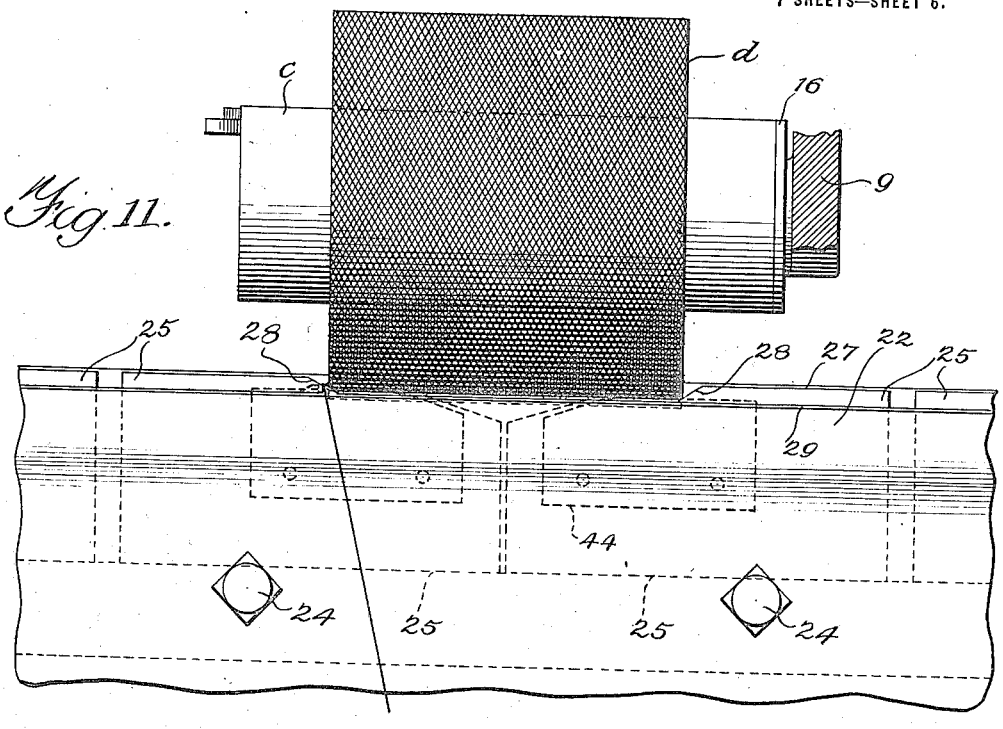
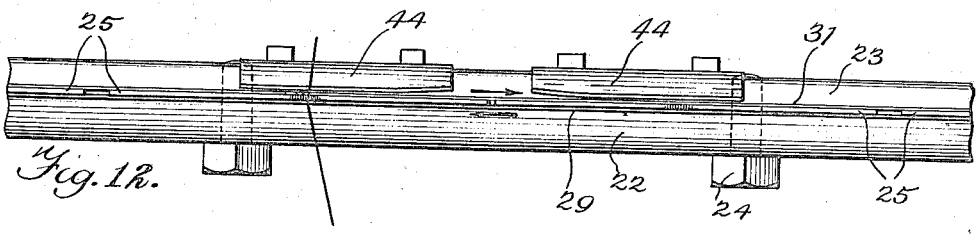

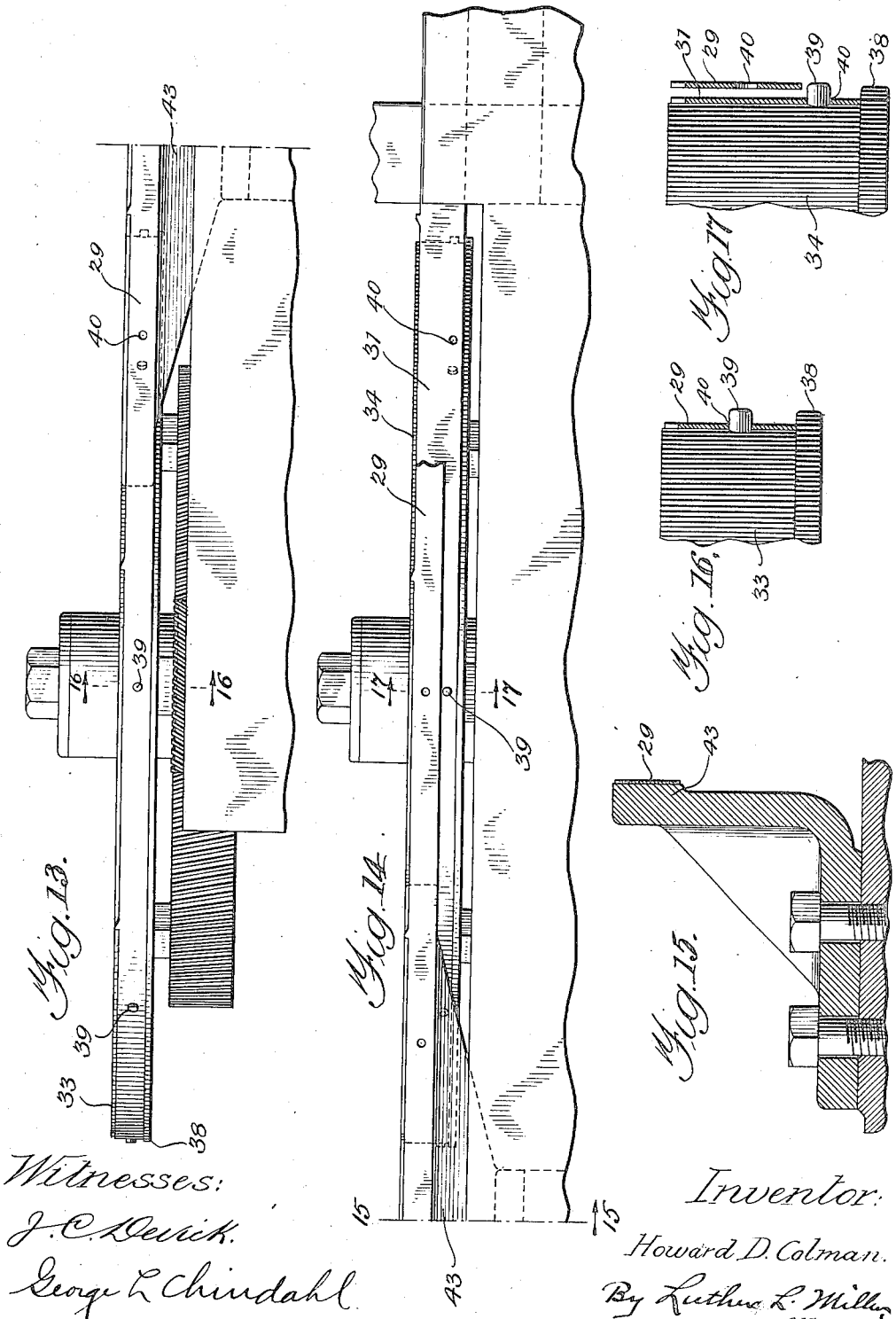

UNITED STATES PATENT OFFICE.

HOWARD D. COLMAN, OF ROCKFORD, ILLINOIS, ASSIGNOR TO HOWARD D. COLMAN, LUTHER L. MILLER, AND HARRY A. SEVERSON, COPARTNERS TRADING AS BARBER-COLMAN COMPANY, OF ROCKFORD, ILLINOIS.

TRAVERSE MECHANISM FOR WINDING-MACHINES.

1,239,669.      Specification of Letters Patent.      Patented Sept. 11, 1917.

Application filed October 30, 1911, Serial No. 657,529. Renewed February 10, 1916. Serial No. 77,525.

*To all whom it may concern:*

Be it known that I, HOWARD D. COLMAN, a citizen of the United States, residing at Rockford, in the county of Winnebago and State of Illinois, have invented certain new and useful Improvements in Traverse Mechanisms for Winding-Machines, of which the following is a specification.

This invention relates to spoolers and winders, and its object is to provide means for traversing the thread back and forth upon the spool or cheese, the traversing means being of such character that it may be operated very rapidly and thus permit of a great increase in the speed of winding.

Figure 9:
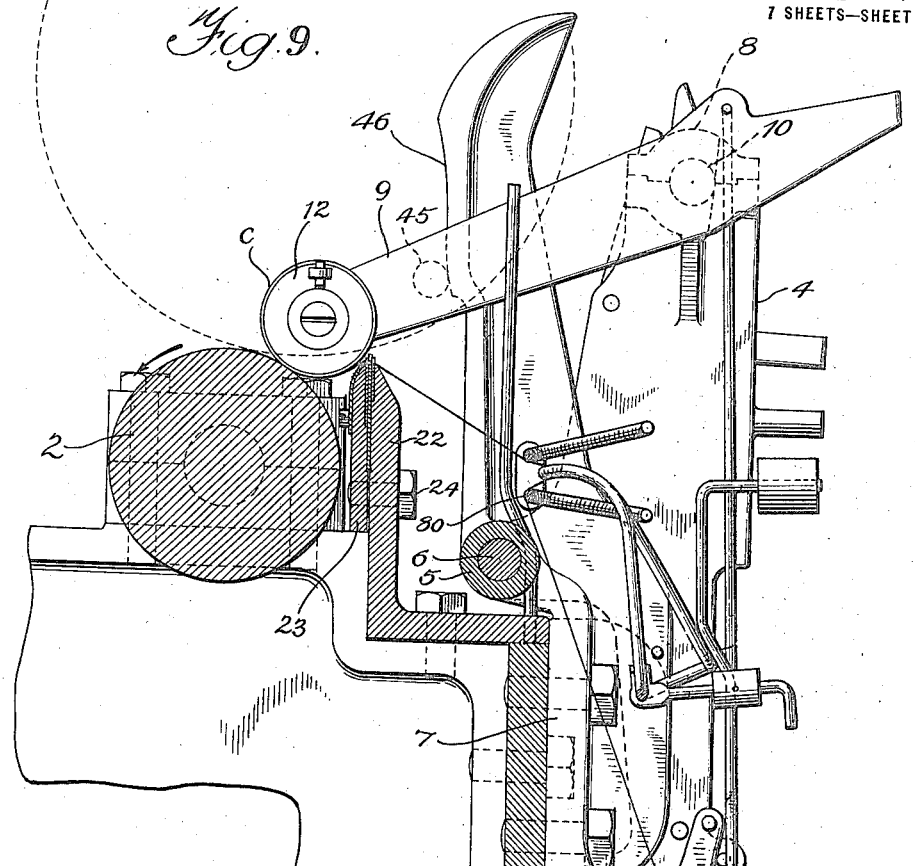
Figure 10:
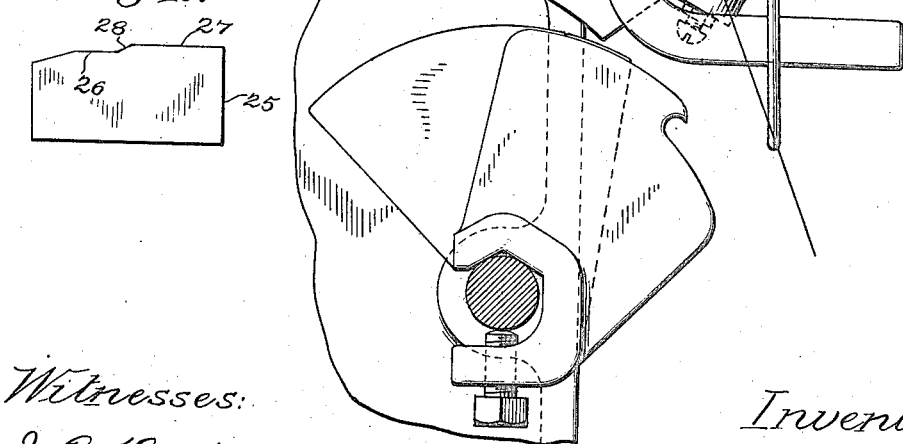

In the accompanying drawings, Figures 1 and 2 are top plan views of opposite end-portions of a winder embodying the features of my invention. Figs. 3 and 4 are vertical sectional views of the portions shown in Figs. 1 and 2 respectively. Fig. 5 is a sectional view of the yarn-traversing means. Figs. 6, 7 and 8 are views in a series illustrating the operation of the yarn-traversing means. Fig. 9 is a vertical sectional view showing a thread as being wound upon the thread container. Fig. 10 is a detail view of a part comprised in the traverse motion. Fig. 11 is a fragmental side elevation illustrating the action of the traversing means. Fig. 12 is a top plan view of a portion of the traversing means. Fig. 13 is a fragmental side elevation illustrating the means for actuating the yarn-traversing means. Fig. 14 is a continuation of Fig. 13. Fig. 15 is a section on line 15—15 of Fig. 14. Fig. 16 is a section on line 16—16 of Fig. 13. Fig. 17 is a section taken in the plane of line 17—17 of Fig. 14.

The embodiment herein shown of my invention is a machine for winding yarn from bobbins *a* onto cores *c* (Fig. 11) to form cheeses *d*. Said machine comprises an elongated framework 1 having two parallel "sides," each side being furnished with means for rotatably supporting bobbins and means for supporting and rotating cores or cheeses.

In the present embodiment the cores or cheeses are rotated through peripheral contact with rolls 2, one being provided for each side of the machine. The rolls 2 may be driven in any suitable manner, as, for instance, by means of belts (not shown) extending over pulleys 3 (Fig. 2) fixed upon the journals of the rolls.

At each side of the supporting frame is a series of brackets 4, each mounted so as to be capable of a slight pivotal movement, for a purpose to appear hereinafter. In this instance each bracket 4 is provided with a bearing sleeve 5 (Fig. 9) which is rotatably mounted on a rod 6 the ends of which are supported in brackets 7 fixed to the machine framework. As shown in Fig. 9 the point of pivotal support for each bracket 4 is at one side of its center of gravity, so that the bracket tends to occupy the position represented in said figure.

Each bracket 4 has bearings 8 at its upper end. 9 is a cheese-supporting lever provided upon one side and between its ends with a pivot 10 which is mounted in the bearings 8 said pivot being fast to the lever. At the end of the long arm of the lever 9 is means 12 for rotatably supporting the cheese, which means may be of any suitable character.

The yarn is traversed back and forth to build up the cheese by means to be now described. Fixed in the supporting framework in front of each roll 2 is a rail or flange 22 and at the rear or inner side of said rail is another rail 23, said rails being secured together by screws 24. Between said rails are clamped pairs of plates 25. Each plate has an edge 26 (Figs. 5 and 10) extending above the horizontal plane of the upper edge of the rails, an edge 27 in a still higher plane, and an inclined or cam portion 28 extending between said edges. The cam portions 28 upon each pair of plates are at the limits of the to-and-fro motion of the yarn. The yarn is moved laterally in one direction by an endless traveling tape 29 having yarn-engaging projections 30 thereon, and the yarn is moved in the opposite direction by a similar endless tape 31 having like projections 32. Said tapes travel through guideways formed between the rails 22 and 23 and the plates 25. The tapes may be driven by any suitable means. Herein I have shown two pulleys or band wheels 33 and 34 (Fig. 1) arranged for rotation in opposite directions upon vertical axes at one end of the winder framework. The tape 29 extends about the pulley 33, while the tape 31 passes around the pulley 34. As herein shown the pulleys are of equal diameter and are rotated at the same rate in order that both tapes may travel at the same speed. Said pulleys may be driven in any suitable manner, as, for example, by means of worms 35 fixed upon a shaft 36 connected to one of the rolls 2, said worms engaging worm-wheels 37 fixed to the pulleys 33 and 34. Each of said pulleys is provided at its lower side with a peripheral flange 38 (Figs. 16 and 17) to prevent the tapes from running off the pulleys. Each pulley also has a peripheral series of pins 39 adapted to enter openings 40 in the tapes. Herein I have shown the projections 39 as being longer than the thickness of the tape, although it will be evident that said pins may be of less length. In order to prevent interference of the projections upon the wheel 34 with the tape 29 when said projections are of the length therein shown, the tape 31 may be made wider than the tape 29 and the projections 39 upon the wheel 34 may be located in a plane below the plane of the lower edge of the tape 29, as indicated in Figs. 14 and 17.

At the opposite end of the machine the tapes extend around idlers 41 and 42 which may be mounted for adjustment as represented in Figs. 2 and 4 in order that the tapes may be kept under proper tension.

In order to hold the tape 29 out of contact with the tape 31 at the ends of the machine I provide guides 43 (Figs. 1, 2 and 15), past which guides the tape 29 extends.

The operation of the traversing means will be best understood by reference to Figs. 5 to 8, 11 and 12. Figs. 11 and 12 represent a projection on the tape 29 as having carried the thread to the left across the periphery of the cheese, the projection being shown as forcing the thread up the inclined or cam surface 28. As soon as the yarn has been carried above the projection, the yarn will of course be free from said projection, and the tension of winding will cause the yarn to spring into or toward a straight line joining the bobbin and the cheese. At this moment a projection upon the tape 31 traveling the opposite direction catches the yarn and moves it toward the right across the periphery of the cheese. After the right-hand traverse has been completed the yarn is released from the tape 31 by the right-hand cam surface 28, and is then picked up by a projection upon the tape 29 and again moved to the left. The tapes thus alternately pick up the yarn and move it over the periphery of the cheese.

It will be seen that the traversing means is rotatory, no reciprocating parts being used, and that consequently the speed of operation is not limited by the momentum of reciprocating devices, as in prior machines. A great increase in winding speed is thereby rendered possible.

The surfaces 26 of the plates 25 are preferably in a plane above the upper edge of the tape 29 so as to support the yarn out of contact with such upper edge. Guide plates 44 fixed to the rear side of the rail 23 prevent the yarn running to a small cheese from bearing against the upper edge of the tape 31. (See Figs. 5 and 9.)

Referring to Fig. 9: It is desirable to keep the yarn-traversing means and the periphery of the cheese close together during the winding operation. For this purpose the bracket 4 is pivotally supported, as hereinbefore described, and a stud 45 on the lever 9 is arranged to lie against a cam or guide surface 46 on the bracket 7, said guide surface being of such form that as the cheese increases in diameter the center of the cheese will move upwardly in such a path as will cause the periphery of the cheese to remain close to the yarn-traversing means.

The means for detecting exhaustion of the yarn and for throwing the cheese out of operation will not be described, as said means forms no part of this invention.

The claims have been restricted to the traverse mechanism. Other mechanisms shown will be claimed in separate applications.

In some of the following claims I have, for the sake of brevity, used the term "a winding couple" to indicate two yarn masses or packages, one of which is being unwound onto the other, without regard to the form or location of such masses.

I claim as my invention:

1. The combination of means for supporting a winding couple; two members arranged to alternately engage the yarn; means at each side of the yarn-receiving element of the couple for disengaging the yarn from one of said members; and means for moving said members in opposite directions.

2. The combination of means for supporting a winding couple; two endless tapes arranged to alternately move the yarn; and means for actuating said tapes in opposite directions.

3. The combination of means for supporting a winding couple; two endless tapes arranged to alternately move the yarn, both tapes traveling in the same plane; and means for actuating said tapes in opposite directions.

4. The combination of a row of winder units each comprising means for supporting a winding couple; two endless tapes arranged to alternately move the yarn; two runs of said tapes extending side by side and in the same plane and longitudinally of the row of winding units; and means for actuating said tapes in opposite directions.

5. The combination of means for supporting a winding couple; two members movable in opposite directions and each provided with means adapted to engage the yarn, said members moving substantially transversely of the path of the running thread; and stationary means at the sides of the yarn-receiving element of the couple to release the thread from said members alternately.

6. The combination of means for supporting a winding couple; two members movable in opposite directions and each provided with projections adapted to engage the yarn, said members moving substantially transversely of the path of the running thread; and two oppositely-inclined members up which said movable members carry the thread, whereby the thread is raised above and thus released from said projections.

7. The combination of means for supporting a winding couple; two endless tapes movable in opposite directions, each provided with projections adapted to engage the yarn, said members moving substantially transversely of the path of the running thread; and two inclined portions up which the thread is carried by said tapes, whereby the thread is raised above and thus released from said projections.

8. The combination of means for supporting a winding couple; an endless member having a series of projections thereon to engage the yarn; means for continuously moving said member in one direction, said projections carrying the yarn laterally in that direction; stationary means for releasing the yarn from the successive projections; and means for laterally moving the yarn in the opposite direction.

9. In a traverse mechanism, two endless yarn-moving tapes lying in approximately the same plane and one within the one; two drive pulleys, around each of which extends one of said tapes; and guide means around which said tapes travel.

10. In a traverse mechanism, an inner and an outer endless yarn-moving tape, the upper edges of said tapes being in the same plane, and the inner tape being wider than the outer tape; means engaging the outer tape for driving it; and means engaging the inner tape below the plane of the lower edge of the outer tape, for driving the inner tape.

11. In a traverse mechanism, an inner and an outer endless yarn-moving tape, the upper edges of said tapes being in the same plane, and the inner tape being wider than the outer tape; means engaging the outer tape for driving it, and a drive-stud on the pulley for the inner tape adapted to enter openings in the portion of said inner tape which is below the plane of the lower edge of the outer tape.

12. The combination of means for supporting a winding couple, means for traversing the yarn, and means at each side of the yarn-receiving element of the couple for disengaging the yarn from the traversing means.

13. The combination of means for supporting a winding couple, means for traversing the yarn, and two oppositely inclined members up which the traversing means carries the yarn, whereby the yarn is raised above and thus released from the traversing means.

14. The combination of means for supporting a winding couple, two members movable in opposite directions, and each provided with a projection adapted to engage the yarn, and two inclined portions up which the yarn is carried by said members, whereby the yarn is raised above and thus released from said projections.

15. In a quick traverse mechanism, two yarn-engaging members movable in opposite directions, and two members located between the first mentioned members, the second mentioned members having surfaces adapted to cam the yarn out of engagement with the first mentioned members.

16. In a quick traverse mechanism, two yarn-engaging members movable in opposite directions, and two members located between the first mentioned members, the second mentioned members having surfaces adapted to cam the yarn out of engagement with the first mentioned members, the second mentioned members also having surfaces adapted to support the yarn out of contact with the first mentioned members.

17. In a quick traverse mechanism, the combination of two endless tapes arranged to be driven in opposite directions, a structure in which two parallel portions of said tapes are guided, and means mounted in said structure between said parallel portions for releasing the yarn from said tapes.

18. In a quick traverse mechanism, the combination of two endless tapes arranged to be driven in opposite directions, a structure in which two parallel portions of said tapes are guided, and means mounted in said structure between said parallel portions for releasing the yarn from said tapes, said means being adapted to support the yarn out of contact with the tapes.

19. In a winder, package-supporting means, means for rotating the package, and yarn-guiding members movable rectilineally in opposite directions past the package to alternately engage the yarn and lead it back and forth across the face of the package while being wound thereon.

In testimony whereof I affix my signature in presence of two witnesses.

HOWARD D. COLMAN.

Witnesses:
 JOHN F. ELWOOD,
 LOUISE A. CULVER.